United States Patent
Keeling

(10) Patent No.: US 11,957,268 B2
(45) Date of Patent: Apr. 16, 2024

(54) COLD BREW ADAPTER SYSTEM

(71) Applicant: JPK Startups, LLC, Tampa, FL (US)

(72) Inventor: Jody P. Keeling, Tampa, FL (US)

(73) Assignee: JPK STARTUPS, LLC, Tampa, FL (US)

( * ) Notice: Subject to any disclaimer, the term of this patent is extended or adjusted under 35 U.S.C. 154(b) by 420 days.

(21) Appl. No.: 17/150,460

(22) Filed: Jan. 15, 2021

(65) Prior Publication Data
US 2021/0219765 A1 Jul. 22, 2021

Related U.S. Application Data

(60) Provisional application No. 62/962,374, filed on Jan. 17, 2020.

(51) Int. Cl.
*A47J 31/02* (2006.01)
*A47J 31/06* (2006.01)
*A47J 31/20* (2006.01)
*A47J 31/44* (2006.01)

(52) U.S. Cl.
CPC ........... *A47J 31/02* (2013.01); *A47J 31/0636* (2013.01); *A47J 31/20* (2013.01); *A47J 31/4403* (2013.01)

(58) Field of Classification Search
CPC ........ A47J 31/02; A47J 31/0636; A47J 31/20; A47J 31/4403
USPC .......................................................... 99/287
See application file for complete search history.

(56) References Cited

U.S. PATENT DOCUMENTS

| | | | | |
|---|---|---|---|---|
| 2,162,348 | A * | 6/1939 | Hacmac | A47J 43/105 222/545 |
| 4,821,630 | A * | 4/1989 | Roberts | A47G 19/14 426/77 |
| 4,828,850 | A * | 5/1989 | Davis | A47J 31/02 426/77 |
| 5,784,828 | A * | 7/1998 | Thompson | A01K 95/00 43/44.87 |
| 5,894,952 | A * | 4/1999 | Mendenhall | B65D 47/06 220/717 |
| 6,314,866 | B1 * | 11/2001 | Melton | B65D 85/816 426/433 |
| 7,162,830 | B2 * | 1/2007 | Sims | A01K 95/02 43/44.87 |
| 9,107,541 | B2 * | 8/2015 | Bodum | A47J 31/00 |
| 10,363,527 | B2 * | 7/2019 | Johnson | B01F 27/113 |
| 2013/0312621 | A1 * | 11/2013 | Liu | A47J 31/18 99/323 |
| 2014/0174965 | A1 * | 6/2014 | Herling | A47J 41/0077 206/216 |
| 2015/0164261 | A1 * | 6/2015 | Fukumura | A47J 31/18 99/323 |
| 2018/0077945 | A1 * | 3/2018 | Hampton | A47J 19/005 |
| 2018/0078080 | A1 * | 3/2018 | Drummond | A47J 31/0636 |

(Continued)

FOREIGN PATENT DOCUMENTS

JP 6168637 B1 * 7/2017
WO WO-2016161024 A1 * 10/2016 ............. A47J 31/02

*Primary Examiner* — Omar Flores Sanchez
(74) *Attorney, Agent, or Firm* — Brian J. Colandreo; Jeffery T. Placker; Holland & Knight LLP

(57) ABSTRACT

A cold-brew adapter system includes: an adapter assembly configured to interface with an upper portion of a pour-over coffee system; and a steeping assembly configured to receive ground coffee and position the ground coffee within a liquid contained in a lower portion of the pour-over coffee system.

20 Claims, 1 Drawing Sheet

(56) References Cited

U.S. PATENT DOCUMENTS

| | | | |
|---|---|---|---|
| 2018/0289198 A1* | 10/2018 | Scholtens | A23F 5/26 |
| 2019/0269273 A1* | 9/2019 | Castillo Redondo | A47J 31/0626 |
| 2020/0039738 A1* | 2/2020 | Duman | A47G 19/2272 |
| 2020/0383514 A1* | 12/2020 | Kaptelinin | A47J 31/0636 |
| 2021/0038016 A1* | 2/2021 | Sjaastad | A47J 31/446 |
| 2021/0059463 A1* | 3/2021 | Ellis | A47J 31/02 |
| 2021/0267406 A1* | 9/2021 | Rechsteiner | A47J 31/005 |
| 2021/0338000 A1* | 11/2021 | Almagor | A47J 31/06 |
| 2022/0167776 A1* | 6/2022 | Munsinger | A23F 3/18 |
| 2022/0354295 A1* | 11/2022 | Kucera | A47J 31/4407 |
| 2023/0037611 A1* | 2/2023 | De Wet | A47J 31/0636 |

\* cited by examiner

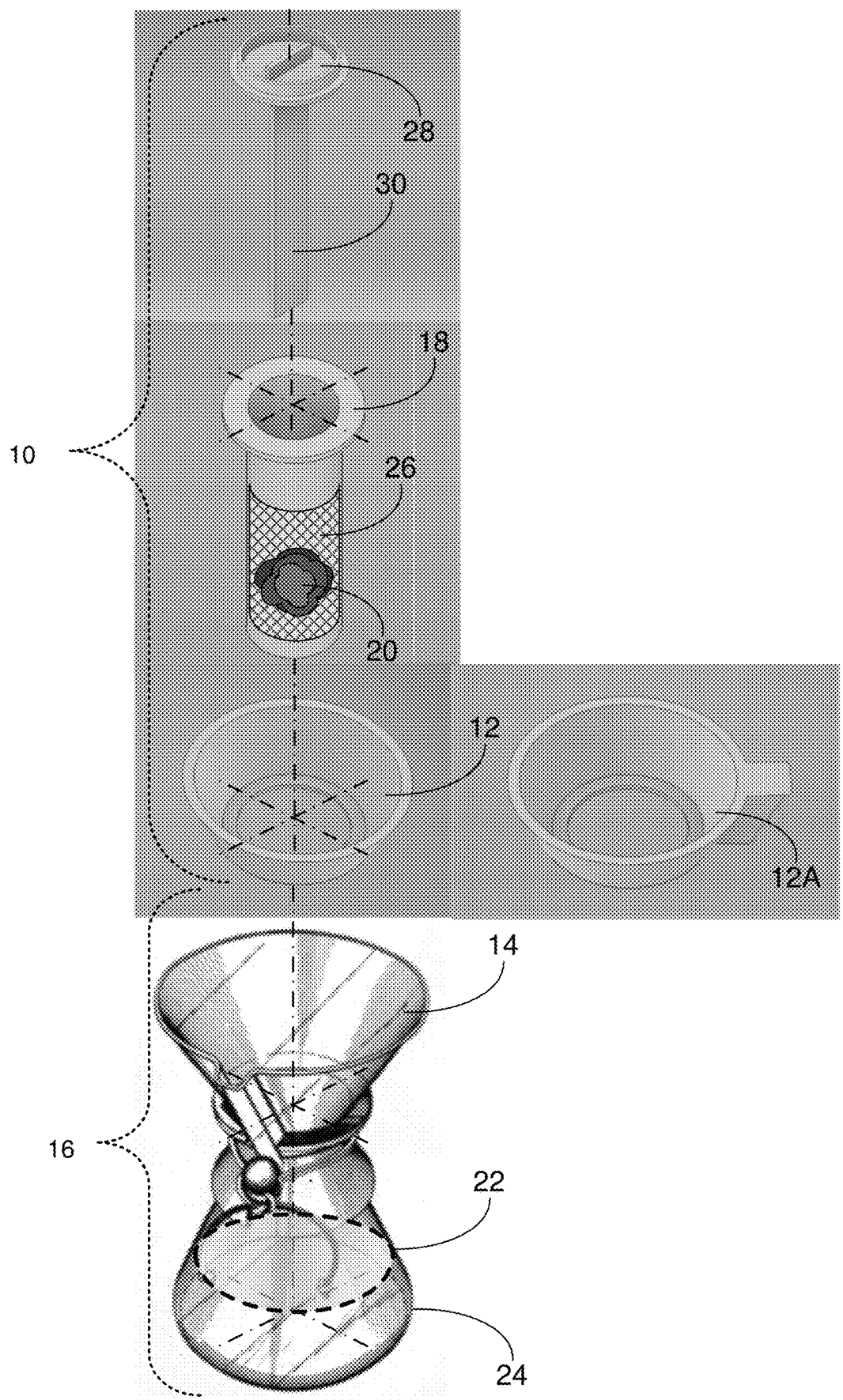

COLD BREW ADAPTER SYSTEM

RELATED APPLICATION(S)

This application claims the benefit of U.S. Provisional Application No. 62/962,374, filed on 17 Jan. 2020, the entire contents of which are incorporated herein by reference.

TECHNICAL FIELD

This disclosure relates to brewing systems and, more particularly, to cold brew brewing systems.

BACKGROUND

Apparatuses for brewing coffee are well known in the art. In the known art, coffee is customarily drip-brewed using heated water. Water is heated in a vessel, and then poured over a container of ground coffee. As the water mingles with the grounds, a coffee extract is produced which drips through a filter into a coffee pot or cup.

One variation of this type of brewing method is the pour over coffee technique. It involves dispensing hot water into a brewing substance such as ground coffee beans that are held in a paper or metal filter, with the water infusing and extracting flavors from the brewing substance as it drains through. Typically, the brewing time for hot pour over coffee is about five minutes.

Although coffee is traditionally brewed in hot or boiling water, it is also possible to cold brew coffee. Since many of the bitter oils and acids contained in coffee are soluble only at high temperature, coffee brewed with hot or boiling water can be characterized by a harsh acrid taste. Cold brewed coffee avoids this problem, however the brewing time for cold brew coffee typically takes at least twelve hours to brew.

The brewing method for cold brew coffee is distinctly different than the process for hot pour over coffee. Hot pour over coffee is brewed using a drip method where hot water is poured directly through the coffee grounds and is typically available for consumption immediately after the water has dripped through the coffee grounds and collected in the container below. However, cold brew coffee is brewed using a form of the immersion method, where the coffee is immersed in the cold water and is left to steep for a number of hours before the coffee grounds are removed to leave a drinkable cold brew coffee solution.

Several developments in the hot pour over coffee and cold brew process have been made, however nothing has been created to enable a person to make hot pour over coffee or cold brew coffee using the same device.

SUMMARY OF DISCLOSURE

In one implementation, a cold-brew adapter system includes: an adapter assembly configured to interface with an upper portion of a pour-over coffee system; and a steeping assembly configured to receive ground coffee and position the ground coffee within a liquid contained in a lower portion of the pour-over coffee system.

One or more of the following features may be included. The upper portion of the pour-over coffee system may be generally funnel-shaped. The adapter assembly may be generally cone-shaped and configured to engage the upper portion of the pour-over coffee system. An agitator assembly may be configured to be removably received within the steeping assembly and enable agitation of the ground coffee contained therein. The agitator assembly may include a blade assembly configured to engage the ground coffee contained therein. The agitator assembly may further be configured to form a generally watertight seal with the adapter assembly. The agitator assembly may further be configured to form a generally watertight seal with the steeping assembly. The adapter assembly may be configured to form a generally watertight seal with the upper portion of the pour-over coffee system. The steeping assembly may be configured to form a generally watertight seal with the adapter assembly. The steeping assembly may be a liquid-permeable steeping assembly. The steeping assembly may include a liquid-permeable screen assembly. At least a portion of the cold-brew adapter system may be constructed of one or more of: a plastic material; a silicon material; and a metallic material. The adapter assembly and the steeping assembly may be a unitary assembly.

In another implementation, a cold-brew adapter system includes: an adapter assembly configured to interface with an upper portion of a pour-over coffee system; a steeping assembly configured to receive ground coffee and position the ground coffee within a liquid contained in a lower portion of the pour-over coffee system; and an agitator assembly configured to be removably received within the steeping assembly and enable agitation of the ground coffee contained therein; wherein the upper portion of the pour-over coffee system is generally funnel-shaped; and the adapter assembly is generally cone-shaped and configured to engage the upper portion of the pour-over coffee system.

One or more of the following features may be included. At least a portion of the cold-brew adapter system may be constructed of one or more of: a plastic material; a silicon material; and a metallic material. The adapter assembly may be configured to form a generally watertight seal with the upper portion of the pour-over coffee system. The steeping assembly may be configured to form a generally watertight seal with the adapter assembly. The steeping assembly may be a liquid-permeable steeping assembly. The steeping assembly may include a liquid-permeable screen assembly.

In another implementation, a cold-brew adapter system includes: an adapter assembly configured to interface with an upper portion of a pour-over coffee system; a steeping assembly configured to receive ground coffee and position the ground coffee within a liquid contained in a lower portion of the pour-over coffee system; and an agitator assembly configured to be removably received within the steeping assembly and enable agitation of the ground coffee contained therein; wherein the agitator assembly includes a blade assembly configured to engage the ground coffee contained therein.

One or more of the following features may be included. At least a portion of the cold-brew adapter system may be constructed of one or more of: a plastic material; a silicon material; and a metallic material.

The details of one or more implementations are set forth in the accompanying drawings and the description below. Other features and advantages will become apparent from the description, the drawings, and the claims.

BRIEF DESCRIPTION OF THE DRAWINGS

FIG. 1 is a diagrammatic view of a cold-brew adapter system for use with a pour-over coffee system according to an embodiment of the present disclosure.

DETAILED DESCRIPTION OF THE PREFERRED EMBODIMENTS

Like reference symbols in the various drawings indicate like elements.

Referring to FIG. 1, there is shown cold-brew adapter system 10. At least a portion of cold-brew adapter system 12 may be constructed of one or more of: a plastic material; a silicon material; and a metallic material.

Examples of such a plastic material may include but are not limited to: Plastic #1: PET or PETE—(Polyethylene Terephthalate); Plastic #2: HDPE—(High Density Polyethylene); Plastic #4: LDPE (Low Density Polyethylene); and Plastic #5: PP—(Polypropylene). An example of such a silicone material made include but is not limited to a food safe silicon, such as non-toxic silicone that does not contain any chemical fillers or byproducts (thus making it safe for use with food). Examples of such a metallic material may include but are not limited to: stainless steel, aluminum and copper.

Cold-brew adapter system 10 may include adapter assembly 12 configured to interface with upper portion 14 of pour-over coffee system 16. As will be explained below and through the use of cold-brew adapter system 10, a traditional pour-over coffee system (e.g., pour-over coffee system 16) may be utilized as a cold-brew coffee system.

Upper portion 14 of pour-over coffee system 16 may be generally funnel-shaped, wherein adapter assembly 12 may be generally cone-shaped and may be configured to engage upper portion 14 of pour-over coffee system 16. Accordingly, adapter assembly 12 may be configured to form a generally watertight seal with upper portion 14 of pour-over coffee system 16. For example, such a generally watertight seal may be achieved by having the exterior shape of adapter assembly 12 match the interior shape of upper portion 14 of pour-over coffee system 16. Additionally, adapter assembly 12 may include a sealing assembly (such as an O-ring, not shown) to achieve the generally watertight seal. In the event that upper portion 14 of pour-over coffee system 16 includes a pouring trough to allow for the easier pouring of liquids from pour-over coffee system 16, adapter assembly 12 may be designed to allow for the sealing of such a pouring trough (as shown in adapter assembly 12A).

Cold-brew adapter system 10 may include steeping assembly 18 configured to receive ground coffee 20 and position ground coffee 20 within liquid 22 contained within lower portion 24 of pour-over coffee system 16. Steeping assembly 18 may be configured to form a generally watertight seal with adapter assembly 12. For example, such a generally watertight seal may be achieved by having the exterior shape of steeping assembly 18 match the interior shape of adapter assembly 12. Additionally, adapter assembly 12 and/or steeping assembly 18 may include a sealing assembly (such as an O-ring, not shown) to achieve the generally watertight seal.

Steeping assembly 18 may be a liquid-permeable steeping assembly, wherein liquid may pass into and out of steeping assembly 18. For example, a liquid placed into steeping assembly 18 may pass through steeping assembly 18 and drain into lower portion 24 of pour-over coffee system 16. Conversely, a liquid placed within lower portion 24 of pour-over coffee system 16 may pass through and drain into steeping assembly 18. For example, steeping assembly 18 may include liquid-permeable screen assembly 26 (e.g., a stainless-steel mesh screen).

For example and when using cold-brew adapter system 12, adapter assembly 12 (or adapter assembly 12A) may be positioned within upper portion 14 of pour-over coffee system 16. Steeping assembly 18 may then be slid into adapter assembly 12 (or adapter assembly 12A) and ground coffee 20 may be placed within steeping assembly 18. Cold water may then be poured into upper portion 14 of pour-over coffee system 16 and this cold water may then saturate ground coffee 20 and pass thru steeping assembly 18, thus draining into lower portion 24 of pour-over coffee system 16 (resulting in coffee-infused liquid 22 gathering in lower portion 24 of pour-over coffee system 16). As steeping assembly 18 is permeable in both directions, ground coffee 20 will steep within liquid 22 (typical for 12+ hours) resulting in the generation of cold brew coffee.

While adapter assembly 12 (or adapter assembly 12A) and steeping assembly 18 are discussed above as two separate components, this is for illustrative purposes only and is not intended to be a limitation of this invention, as other configurations are possible. For example, adapter assembly 12 (or adapter assembly 12A) and steeping assembly 18 may be a unitary (i.e., one piece) assembly.

Cold-brew adapter system 10 may include agitator assembly 28 configured to be removably received within steeping assembly 18 and may enable agitation of ground coffee 20 contained therein. For example, agitator assembly 28 may include blade assembly 30 configured to engage ground coffee 20 contained therein.

For example and during the brewing process, the user of cold-brew adapter system 10 may periodically rotate the upper portion of agitator assembly 28, resulting in the rotation of blade assembly 30. As blade assembly may be configured to be of sufficient length to engage ground coffee 20 (which is steeping within liquid 22), the rotation of blade assembly 30 will result in the agitation of group coffee 20 within liquid 22 (which may expedite the brewing process).

Agitator assembly 28 may further configured be to form a generally watertight seal with steeping assembly 18. For example and during the brewing process (e.g., 12 hours), agitator assembly 28 may fit snugly within the interior of steeping assembly 18, resulting in agitator assembly 28 isolating liquid 22 within lower portion 24 of pour-over coffee system 16 from any outside influences/contaminants (e.g., odors present in the location of cold-brew adapter system 10). This generally watertight seal between agitator assembly 28 and steeping assembly 18 may be achieved by having the exterior shape of agitator assembly 28 match the interior shape of steeping assembly 18. Additionally, agitator assembly 28 and/or steeping assembly 18 may include a sealing assembly (such as an O-ring, not shown) to achieve the generally watertight seal.

Once the brewing process is complete, steeping assembly 18 may be removed from adapter assembly 12 (or adapter assembly 12A) to stop the brewing process. Accordingly, agitator assembly 26 may be configured to form a generally watertight seal with adapter assembly 12 (or adapter assembly 12A). For example, agitator assembly 26 may fit snugly within the interior of adapter assembly 12 (or adapter assembly 12A), resulting in agitator assembly 26 isolating liquid 22 within lower portion 24 of pour-over coffee system 16 from outside influences/contaminants (e.g., odors present in the location of cold-brew adapter system 10). This generally watertight seal between agitator assembly 26 and adapter assembly 12 (or adapter assembly 12A) may be achieved by having the exterior shape of agitator assembly 26 match the interior shape of adapter assembly 12 (or adapter assembly 12A). Additionally, agitator assembly 26 and/or adapter assembly 12 (or adapter assembly 12A) may include a sealing assembly (such as an O-ring, not shown) to achieve the generally watertight seal.

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A cold-brew adapter system comprising:
   an adapter assembly configured to interface with an upper portion of a pour-over coffee system, wherein the upper portion of the pour-over coffee system is generally funnel-shaped; and
   a steeping assembly configured to receive ground coffee and position the ground coffee within a liquid contained in a lower portion of the pour-over coffee system.

2. The cold-brew adapter system of claim 1 wherein:
   the adapter assembly is generally cone-shaped and configured to engage the upper portion of the pour-over coffee system.

3. The cold-brew adapter system of claim 1 further comprising:
   an agitator assembly configured to be removably received within the steeping assembly and enable agitation of the ground coffee contained therein.

4. The cold-brew adapter system of claim 3 wherein the agitator assembly includes a blade assembly configured to engage the ground coffee contained therein.

5. The cold-brew adapter system of claim 3 wherein the agitator assembly is further configured to form a generally watertight seal with the adapter assembly.

6. The cold-brew adapter system of claim 3 wherein the agitator assembly is further configured to form a generally watertight seal with the steeping assembly.

7. The cold-brew adapter system of claim 1 wherein the adapter assembly is configured to form a generally watertight seal with the upper portion of the pour-over coffee system.

8. The cold-brew adapter system of claim 1 wherein the steeping assembly is configured to form a generally watertight seal with the adapter assembly.

9. The cold-brew adapter system of claim 1 wherein the steeping assembly is a liquid-permeable steeping assembly.

10. The cold-brew adapter system of claim 9 wherein the steeping assembly includes a liquid-permeable screen assembly.

11. The cold-brew adapter system of claim 1 wherein at least a portion of the cold-brew adapter system is constructed of one or more of:
    a plastic material;
    a silicon material; and
    a metallic material.

12. The cold-brew adapter system of claim 1 wherein the adapter assembly and the steeping assembly are a unitary assembly.

13. A cold-brew adapter system comprising:
    an adapter assembly configured to interface with an upper portion of a pour-over coffee system;
    a steeping assembly configured to receive ground coffee and position the ground coffee within a liquid contained in a lower portion of the pour-over coffee system; and
    an agitator assembly configured to be removably received within the steeping assembly and enable agitation of the ground coffee contained therein;
    wherein the upper portion of the pour-over coffee system is generally funnel-shaped; and the adapter assembly is generally cone-shaped and configured to engage the upper portion of the pour-over coffee system.

14. The cold-brew adapter system of claim 13 wherein at least a portion of the cold-brew adapter system is constructed of one or more of:
    a plastic material;
    a silicon material; and
    a metallic material.

15. The cold-brew adapter system of claim 13 wherein the adapter assembly is configured to form a generally watertight seal with the upper portion of the pour-over coffee system.

16. The cold-brew adapter system of claim 13 wherein the steeping assembly is configured to form a generally watertight seal with the adapter assembly.

17. The cold-brew adapter system of claim 13 wherein the steeping assembly is a liquid-permeable steeping assembly.

18. The cold-brew adapter system of claim 17 wherein the steeping assembly includes a liquid-permeable screen assembly.

19. A cold-brew adapter system comprising:
    an adapter assembly configured to interface with an upper portion of a pour-over coffee system, wherein the upper portion of the pour-over coffee system is generally funnel-shaped;
    a steeping assembly configured to receive ground coffee and position the ground coffee within a liquid contained in a lower portion of the pour-over coffee system; and
    an agitator assembly configured to be removably received within the steeping assembly and enable agitation of the ground coffee contained therein;
    wherein the agitator assembly includes a blade assembly configured to engage the ground coffee contained therein.

20. The cold-brew adapter system of claim 19 wherein at least a portion of the cold-brew adapter system is constructed of one or more of:
  a plastic material;
  a silicon material; and
  a metallic material.

\* \* \* \* \*